Patented Jan. 22, 1946

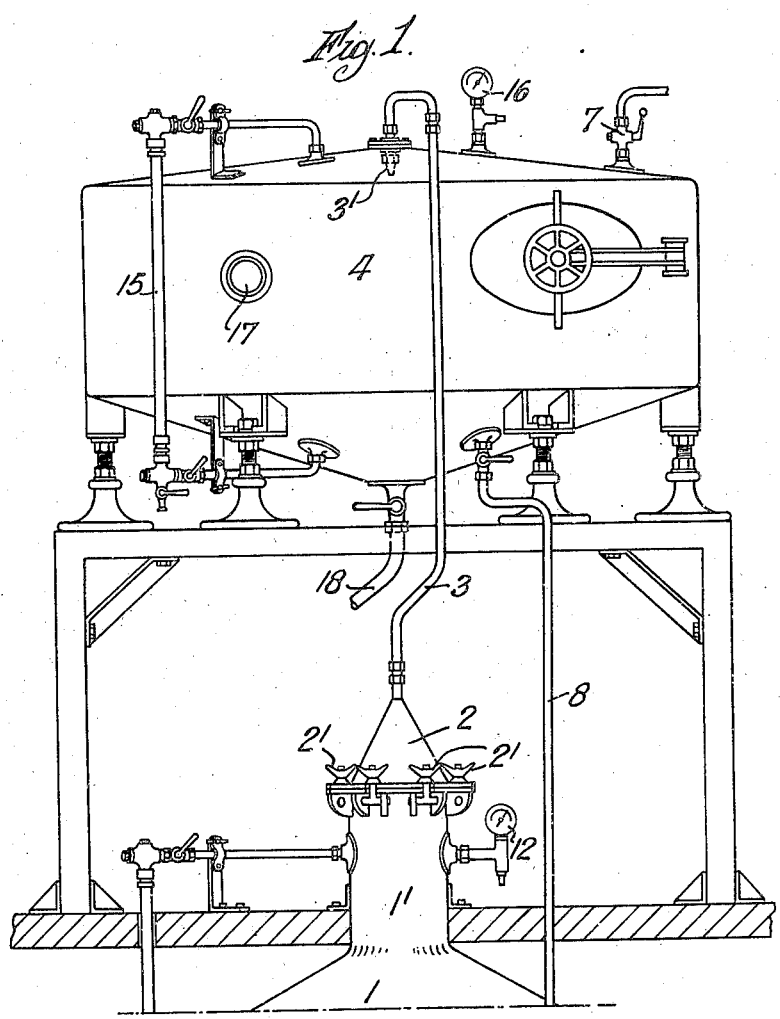

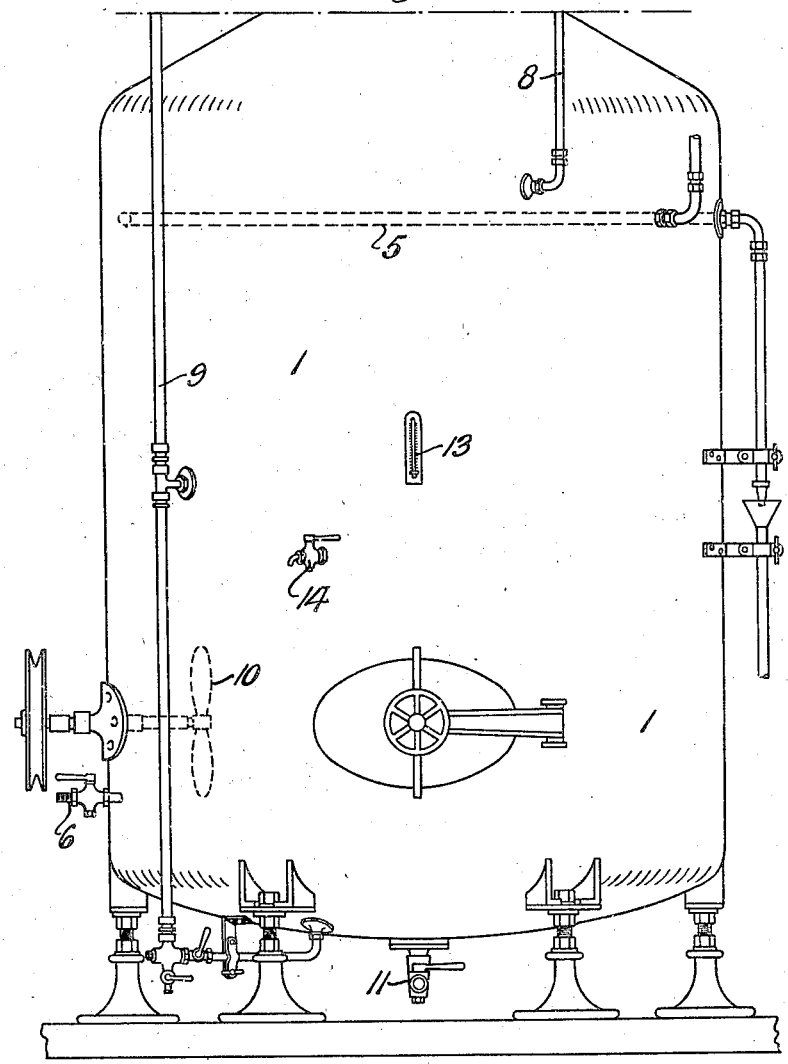
Fig. 1ª

2,393,518

UNITED STATES PATENT OFFICE 2,393,518

FERMENTATION OF BEER

Stephen Towers Clarke, Southampton, England

Application April 5, 1943, Serial No. 481,892
In Great Britain September 3, 1941

3 Claims. (Cl. 99—31)

This invention relates to the fermentation of beer.

The object of the invention is to provide a process and apparatus of the "top fermentation" type which will produce a very full drinking beer of high stability and character.

According to the invention the whole process of fermentation is carried out under pressure in a single enclosed vessel having at the top thereof a detachable cone or dome provided with an outlet pipe of small diameter terminating in a device such as a nipple for controlling the pressure. The outlet of the pipe is at or near the top of an enclosed yeast-back provided with a cock or valve which normally is open to the atmosphere to relieve pressure in the yeast-back. The yeast-back is also provided with a draining tube for returning the yeast drainings to the fermenting vessel.

The fermenting vessel is made of glass lined steel, copper, stainless steel, aluminium or other suitable material and may, if desired, be jacketed but the fermenting vessel and yeast-back are preferably unjacketed and used in a temperature controlled room.

In operation, after "collection," and after a dip and sample have been taken for excise purposes, the yeast dome is clamped in position; the term "collection" is here employed in its trade sense to cover the collecting of the various worts of the brew with any other ingredients. Fermentation proceeds and generates pressure whereby the yeast is forced up to the top of the yeast-back (which is preferably situated above the fermenting vessel) through the yeast pipe and nipple or other pressure controlling device. When the clean yeast starts to issue through the yeast pipe nozzle the dirty head and impurities are washed away leaving the yeast-back clean for the collection and storing of pitching yeast. When it is required to return the yeast drainings from the yeast-back, to the fermenting vessel, the pressures are equalised by closing the cock for releasing the pressure and the drainings flow back by gravity.

The fermenting vessel is fitted with an aerating nozzle through which pure air may be supplied, and fitted with a cooling coil; after fermentation is completed the beer is cooled down ready for racking.

Should it not be practicable to place the yeast vessel above the fermenting vessel, the yeast drainings may be pumped back into the fermenting vessel.

The invention is illustrated in the accompanying drawings in which:

Figures 1 and 1a show respectively the upper and lower parts of an apparatus suitable for carrying the invention into effect.

Referring to the drawings, 1 indicates an enclosed vessel in which the process of fermentation is carried out under pressure, the vessel being preferably made of glass lined steel, copper, stainless steel, aluminium or other suitable material. The vessel is provided at the top with a cylindrical neck 1' having at the top a removable dome or cone 2, which is clamped to the neck 1' of the vessel 1 by clamping means 2'. To the dome 2 is connected a pipe 3, the other end of which is connected through a pressure control nipple 3' to the top of a yeast-back 4 which is preferably situated as shown above the fermenting vessel 1. The pipes 3 and 8 may conveniently be of the same diameter for all vessels, preferably not exceeding 1¼", the pressure in the fermenting vessel (which may be between 5 and 30 lbs. per sq. in. according to the beer being fermented) being controlled by the size of the pressure control nipple 3' according to the size of the vessel and also to the gravity of the beer (the higher the gravity of the beer the greater would be the pressure generated). The vessel 1 is also provided with a cooling coil 5 for use when the fermentation has been completed and with an aerating nozzle 6 through which pure air may be supplied as desired.

The yeast-back 4 is enclosed and is fitted with a cock or valve 7 which is normally open to atmosphere to relieve the pressure and may be connected to a compressor for $CO_2$. To the bottom part of the yeast-back is connected a pipe 8 which leads back to the fermenting vessel 1.

In operation, collection having been effected in the vessel 1, and the contents checked, the dome 2 is clamped in position and fermentation takes place under pressure, the yeast being forced through the pipe 3 into the top of the yeast-back 4, the cock 7 being open. The nozzle 3' is preferably pointing in a downward direction as shown in the drawings. This positioning possesses the advantage that the yeast is forcibly directed on to the top of the yeast in the yeast-back and consolidates it, thus assisting in the separation of the yeast drainings. When it is desired to return the yeast drainings from the yeast-back 4, to the fermenting vessel 1, the pressure in the yeast-back 4 and vessel 1 are equalised by closing the cock 7 and the yeast drainings flow back by gravity through the pipe 8.

The vessel 1 is provided with a sight gauge glass 9, a rouser 10, a filling and emptying cock 11, a pressure gauge and safety valve 12, a thermometer 13 and a sample draw-off cock 14.

The yeast-back 4 is likewise provided with a sight gauge glass 15, pressure gauge and safety valve 16, sight port glass 17 and yeast removal and wash-out pipe 18.

What I claim is:

1. The process of top fermentation of beer which consists in collecting wort in a fermentation zone from which the presence of air other than any sterile air that may be required to stimulate the yeast, is prevented, creating pressure in said zone by fermentation therein, forcing the yeast by said pressure from the fermentation zone through a restricted passage into a yeast-back zone, wherein the pressure is less than that in the fermentation zone, subsequently after fermentation has been completed equalizing the pressures in the fermentation zone and the yeast-back zone, to allow only the yeast drainings to flow from the yeast-back zone to the fermentation zone, cooling and racking the fermented liquid, the whole process of fermentation and cooling being affected in the fermentation zone without the presence of air other than any sterile air added under control in the early stages of fermentation whilst the racking is carried out from said fermentation zone.

2. The process of top fermentation of beer which consists in collecting wort in a fermentation zone from which the presence of air other than any sterile air that may be required to stimulate the yeast, is prevented, creating pressure in said zone by fermentation therein, forcing the yeast by said pressure from the fermentation zone through a restricted passage into a yeast-back zone, wherein the pressure is less than that in the fermentation zone, washing away the dirty head and impurities from the yeast-back zone when the clean yeast starts to issue into the yeast-back zone, subsequently equalizing the pressures in the fermentation zone and the yeast-back zone, to allow only the yeast drainings to flow from the yeast-back zone to the fermentation zone, cooling and racking the fermented liquid, the whole process of fermentation and cooling being effected in the fermentation zone without the presence of air other than any sterile air added under control in the early stages of fermentation whilst the racking is carried out from said fermentation zone.

3. A process as claimed in claim 2, in which after collecting work in the fermentation zone, a gauge of the quantity of wort in the said zone is taken.

STEPHEN TOWERS CLARKE.